SR

9/11/79 XR 4,167,733

United States Patent [19]

Krause et al.

[11] 4,167,733

[45] Sep. 11, 1979

[54] TAMPER-PROOF SECURITY ALARM SYSTEM

[76] Inventors: Edward B. Krause, 20 Meadow Wood Rd., Trumbull, Conn. 06611; William Seiden, 3 Stoneboat Rd., Westport, Conn. 06880

[21] Appl. No.: 758,317

[22] Filed: Jan. 10, 1977

[51] Int. Cl.[2] .......................... G08B 1/08; H04Q 7/00

[52] U.S. Cl. .................................... 340/539; 340/571; 340/572; 340/546; 340/689; 340/566; 340/65; 200/61.45 R; 200/61.52; 200/61.47

[58] Field of Search ............... 340/224, 280, 282, 283, 340/261, 65, 539, 568, 571, 572, 546, 689, 566, 65; 325/111, 119; 200/61.45 R, 61.52, 61.47, DIG. 20, 153 A, 52 A, 33 A, 61.83, DIG. 8, 18

[56] References Cited

U.S. PATENT DOCUMENTS

| | | | |
|---|---|---|---|
| 2,208,841 | 7/1940 | Gillespie | 200/33 A |
| 3,054,096 | 9/1962 | Peritz | 340/261 |
| 3,074,049 | 1/1963 | Saliba et al. | 340/65 |
| 3,597,753 | 8/1971 | Tabankin | 340/283 |
| 3,646,289 | 2/1972 | Craig | 200/61.47 |
| 3,659,265 | 4/1972 | Eversull | 200/61.52 |
| 3,772,646 | 11/1973 | Keith et al. | 340/65 |
| 3,939,421 | 2/1976 | Barringer et al. | 325/133 |
| 3,980,996 | 9/1976 | Greenspan et al. | 325/185 |
| 3,988,724 | 10/1976 | Anderson | 340/224 |

*Primary Examiner*—John W. Caldwell, Sr.
*Assistant Examiner*—Donnie L. Crosland
*Attorney, Agent, or Firm*—H. Gibner Lehmann; K. Gibner Lehmann

[57] ABSTRACT

A tamper-proof security alarm system comprising basically a radio transmitter unit to be located at equipment which is to be protected, and a radio receiver unit with alarm and control circuits located at a point remote from the transmitter. The transmitter unit comprises a unique, wholly self-contained, small portable sensing and triggering assemblage constructed in a novel manner by which it is completely, 100 percent tamper-proof. The sensing and triggering assemblage employs an ultra-sensitive, gravity-responsive electrical switch connected to energize the transmitter, said switch incorporating a suspension system with reset means whereby the switch can be properly oriented to take care of various angularities of the supporting surface on which the assemblage is placed. The reset means clamps the switch in any of an infinite number of oriented positions. Whenever the unit is moved, however slightly, the switch closes and energizes the transmitter. A unique system of additional switches, including an on-off switch, is so arranged that the transmitter is also unfailingly excited to send out a pulse whenever any effort is made to disable the unit. Shifting of the on-off switch from the "on" to the "off" position momentarily excites the transmitter, and actuation of the reset mechanism likewise effects an excitation of the transmitter. The receiver at the remote point responds to all signals of any duration from the transmitter, by giving an alarm or effecting a control function.

17 Claims, 7 Drawing Figures

TAMPER-PROOF SECURITY ALARM SYSTEM

BACKGROUND

This invention relates to security alarm systems, and more particularly to systems of this type which employ radio transmitters and receivers for the purpose of providing a signal when property or equipment is being stolen, vandalized or tampered with.

In the past many safeguard systems have been proposed and produced for protecting property against theft and vandalism. The wiring of windows and doors for the purpose of providing an alarm at a central surveillance station has long been in use. More recently, buildings have been wired and equipped with alarm systems, to foil intruders. These intruder alarms have in many instances involved the placement of electric, window and door switches which were wired to a common alarm apparatus that was continuously energized and in readiness for triggering. More recent and sophistocated alarm systems have also been devised, which involve the use of radio transmitter units that are actuated by magnetic operators, thereby elminating the necessity for installing wiring in walls, moldings, etc. which always is a time-consuming and costly procedure, as well as one which can impair the appearance of building interiors. With such installations, the radio transmitter comprised a small, self-contained unit that was fixedly attached to window or door framing and was triggered by movement of a magnetic piece secured to the window sash or door. These units required for their activation the association with a moving magnetic piece, and could be defeated if the window were to be broken and a jumper wire installed in the case of normally closed switches, or else if an alarm wire were to be snipped in the case of normally open switches. In the case of wired systems, an intruder could easily defeat the same by shorting or cutting those wires which lead from the trigger switches. In each instance of these known intruder alarms there existed the possibility of rendering the device inoperative by manipulating or modifying a part of the system at one point or another of the locale which is to be protected. So far as we are aware, no existing alarm system of whatever type has been completely or 100 percent tamper-proof, for the reasons mentioned above.

SUMMARY

The above disadvantages and drawbacks of prior security alarm systems are obviated by the present invention, which has for an object the provision of an improved security device which is completely foolproof and tamper-proof, whereby the rendering of the device inoperative is virtually impossible. Another object of the invention is to provide an improved tamper-proof alarm as above characterized, wherein the transmitter unit is wholly self-contained and eliminates the necessity of all hard wiring, connecting leads and the like, as well as eliminating the necessity for magnetic or mechanical or other trip or triggering members.

A feature of the invention resides in the provision of a security alarm system which is small and compact, and which can be utilized in virtually all situations, being instantly installable without prior preparation and being capable of installation at small and relatively inaccessible locations. Another feature of the invention resides in the provision of an improved security alarm apparatus which is especially simple to use and place in operation, requiring no expertise or know-how beyond a simple procedure consisting mainly of placement of the transmitter unit on any suitable supporting surface, horizontal or inclined.

Another object of the invention is to provide, for use with security alarm and other alarm or control systems, a unique ultrasensitive electrical switch unit or sensor, which is responsive to the slightest movement such as acceleration, tilting and the like.

Another feature of the invention resides in the provision of an ultra-sensitive sensor or switching means as above characterized, which can be readily and instantly properly oriented to its surroundings at the time of the placement of the unit in which it is contained.

Other features of the present invention involve the provision of a unique monitoring switch arrangement by which the sensing and transmitting unit is made completely tamper-proof, regardless of whether or not the unauthorized personnel are familiar with the construction and principles of the operation of the same.

In accomplishing the above objects the invention provides essentially two basic units, a radio receiver unit with alarm and control circuitry which can be placed at a remote monitoring station, and a radio transmitter and sensing unit consisting of a small black box or casing, which can be placed on any suitable supporting surface of the property or equipment which is to be protected. The radio receiver unit with the signal and control circuitry can be mostly conventional. The transmitter and sensor unit, which is wholly self-contained, comprises a casing which has no connecting wires leading to or from it and which is adapted for placement on either level or else sloping supports. Within the casing there is a sensitive electrical sensor switch which hangs pendant from a pivot whereby it can accommodate itself to a vertical position regardless of the slope of surfaces on which the casing is placed. The pendulous switch-sensor can be clamped by a reset mechanism in any of an infinite number of relative positions with respect to the casing, as determined by the angularity of the latter. The slightest movement, such as shifting, tilting, jarring, vibration, etc. of the casing causes the sensor-switch to close and energize the transmitter which then sends a signal to the receiver located at the remote monitoring point. The transmitter casing has an externally operable on-off switch, and contains a safety switching arrangement by which the transmitter is momentarily energized when the on-off switch is shifted from the "on" to the "off" position. Likewise, the resetting or fixing of the pendulous sensor-switch initially to orient the same causes a momentary excitation of the transmitter, thus serving a double purpose in that it apprises the installer of the operativeness of the transmitter and also at any later time positively prevents an intruder from defeating the transmitter function by actuation of the reset means.

Other features and advantages will hereinafter appear.

Figure 1:
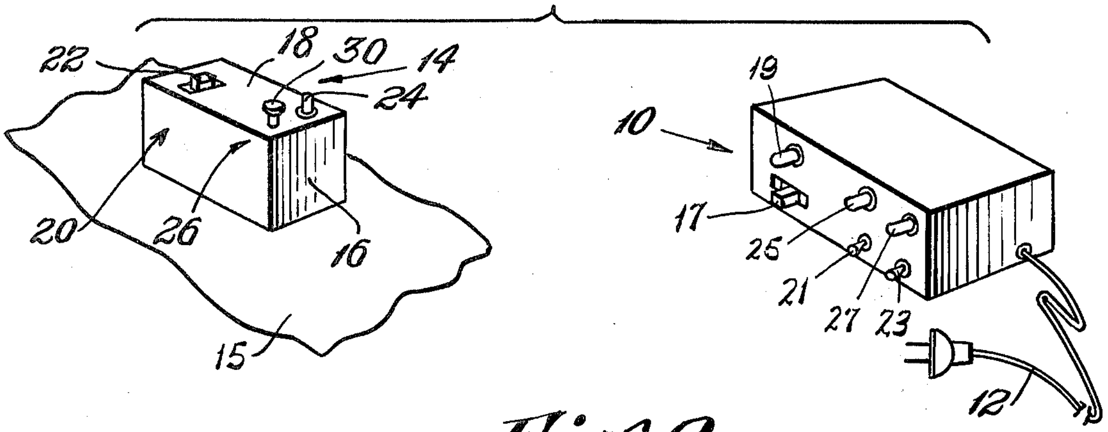
FIG. 1 is a diagrammatic perspective view of the main units making up the improved security alarm system as provided by the invention.

Referring first to FIG. 1, the improved security alarm system is seen to comprise essentially two basic units, a radio receiver unit 10 that can have a power-supply cord 12 and that is intended to be located at a remote surveillance or monitor station, and a transmitter unit 14 which latter is adapted to be placed on a supporting surface 15 of the property or equipment which is to be protected, both being tuned to the same frequency.

Figure 2:
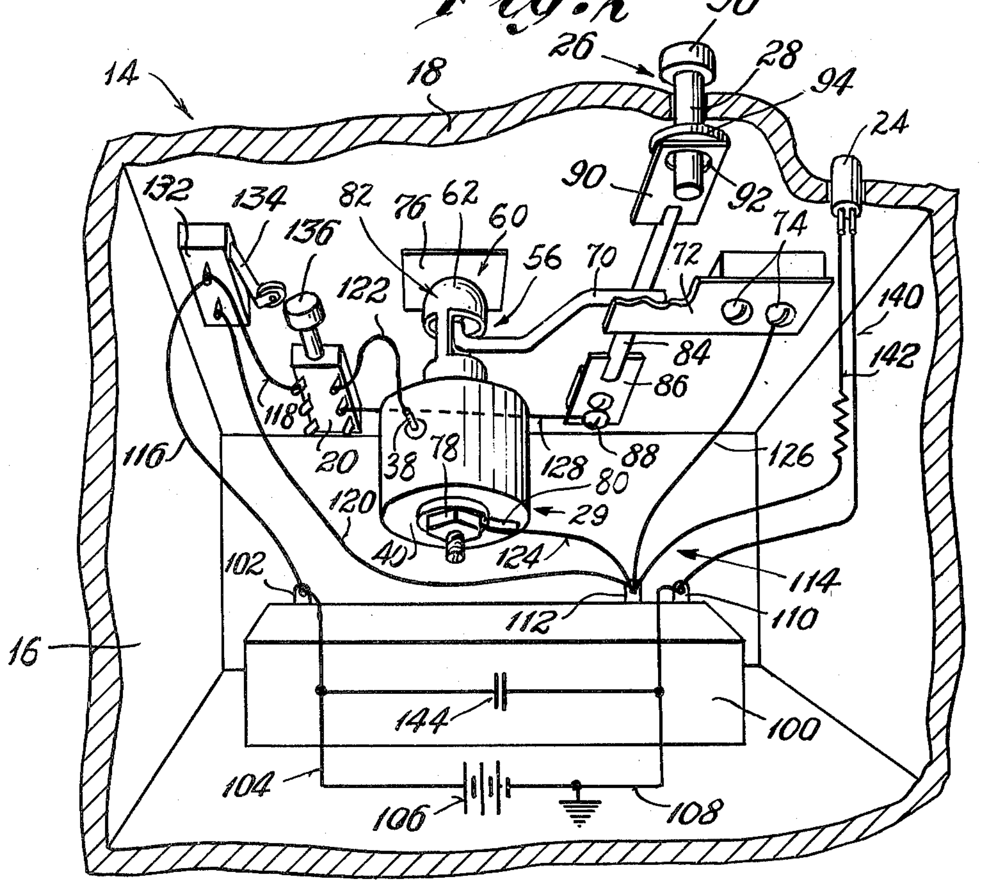
FIG. 2 is a diagrammatic representation of the components in the interior of the casing of the transmitter unit of the alarm system.

The transmitter unit 14 has unique and surprising characteristics, and thus brings to mind the much publicized "black box" commonly encountered in the art of magic. It comprises an exterior casing 16 of plastic or other suitable material, having a top wall 18 on which there is mounted an on-off slide switch 20 having a manually operable member 22. The top wall 18 of the casing 16 also has an indicator or pilot light 24 which may be a light-emitting diode (LED). Adjacent the LED 24 there is a reset device 26 which, as seen in FIG. 2, can comprise a vertically movable plunger 28 having a button 30 at its outer extremity to limit the downward or depressing movement of the plunger 28 for purposes hereinafter disclosed.

In accordance with the present invention, the transmitter unit 14 not only has no external connections, connecting wires or the like leading to or from it, but also does not depend for its operation on the existence of external magnetic or mechanical trip or triggering members. It is basically a wholly self-contained small and light unit which can be conveniently carried about and placed on any suitable supporting surface, either level or sloping. The transmitter unit 14 contains an ultra-sensitive, gravity-controlled and motion-responsive sensor by which it does not depend for its functioning on the presence of any external triggers such as magnetic members or mechanical trips which are commonly provided in existing systems and are adapted to be mounted on window sashes, doors or the like. Instead, the transmitter unit 14 is made operative by a different mode, in that it unfailingly responds to the slightest degree of movement, tilting or acceleration which might be imparted to the casing 16 after the unit has been placed in the desired location and position. Any vibrations or other movement, either of a translational, arcuate or rotary nature will cause the transmitter to be energized and operate; and as provided by this invention such transmitter operation will also be had in the event that the slide switch 20 is shifted to either the "off" position or the "on" position, or in the event that the reset mechanism 26 should be operated. In consequence, it will be understood that the transmitter unit 14 is completely 100 percent tamper-proof or fool-proof, in that there is no possible way in which it could be prevented from sending out at least one signal or rendered totally inoperative by either an authorized or an unauthorized person. If the transmitter is lifted from its supporting surface, or moved laterally, arcuately or rotatably and given even the slightest acceleration, a signal will be sent out to the receiver unit 10 apprising the monitoring personnel at the surveillance station that an effort has been made to burglarize, vandalize or otherwise disturb the equipment supporting the unit 14. Even a relatively sharp and destructive blow, however sudden, will not prevent the unit 14 from sending out a momentary pulse to the receiver unit 10, and the latter is so arranged that it provides a signal or effects a control regardless of the duration of the transmitted signal that is received. Even the producing of a jamming radio signal intended to inactivate the receiver unit 10 will not defeat the functioning of the alarm system, since such jamming signal will obviously activate the alarm or control circuitry of the receiver unit.

Figure 3:
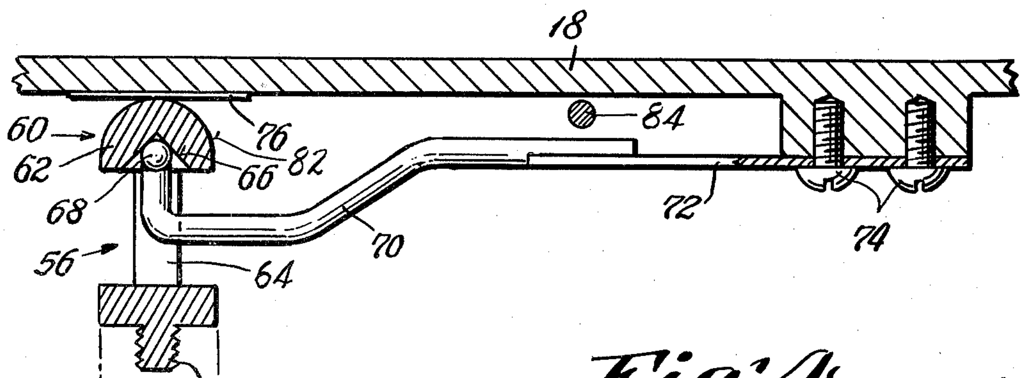
FIG. 3 is a vertical fragmentary section through a portion of the reset mechanism of the transmitter unit.
Figure 4:
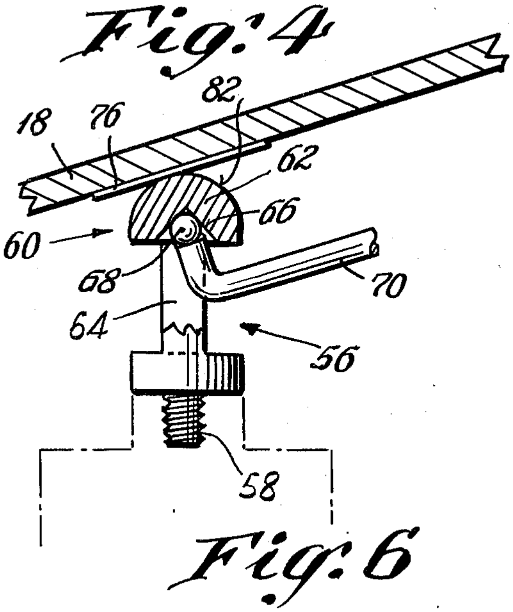
FIG. 4 is a fragmentary view of the pivot and suspension members, illustrating positions which are occupied with the transmitter casing is being supported on a sloping surface.

As seen in FIG. 1, the receiver unit 10 can have an on-off switch 17, a pilot light 19, and control or alarm circuit switches 21, 23 with associated pilot lights 25, 27. Latching relay (not shown) can be included in the receiver unit, as will be understood. At the heart of the transmitter unit 14 is an ultra-sensitive electrical switch or sensor device 29 illustrated in FIGS. 2, 5 and 6. Such ultra-sensitive switch comprises a cylindrical housing 30 disposed with its axis upright and containing an annular pool of mercury 32 carried in an annular recess 34 at the bottom end of the housing. In the recess 34 there is disposed a fixed annular electrical contact 36 connected with a lead wire 38 which is brought out through the cylindrical side wall of the housing 30 and sealed thereto. The bottom wall 40 of the housing 30 carries an upstanding boss 42 which forms the annular recess 34, said boss having a threaded bore 44 in which there is carried an adjusting screw 46 having a slotted actuator end 48. At the interior of the housing 30 the screw 46 carries an adjustable annular electrical contact 50 adapted to be disposed above the mercury pool 32 in spaced relation thereto. The housing 30 is closed at the top by an end cap 52 provided with a threaded boss 54 which receives a suspension or hanger fitting 56 having a threaded stud 58 and a suspension yoke portion 60, the latter comprising a portion of a sphere in the form of a socket 62 carried by two spaced-apart depending legs 64. The socket 62 has a conical recess 66 in its undersurface, accommodating a small ball-extremity 68 of a pivot arm 70 which is carried by a suspension leaf spring 72 secured by screws 74 to the underside of the top wall 18 of the transmitter casing 16. As seen in FIG. 3, the pivot arm 70 is adapted to support and clamp the socket 62 to the underside of the casing wall 18, and specifically to a friction plate or shoe 76 attached to the underside of the top wall 18. The pivot arm 70 can be secured to the leaf spring 72 in any suitable manner, as by welding.

Adjustment of the height of the annular contact 50 is done by turning the screw 46, and such adjustment is fixed by means of a lock nut 78. Under the lock nut 78 a connecting lug 80 is provided, for the purpose of connecting a lead wire to the adjustable contact 50. The switch connections are thus made to the lead wire 38 and the connection lug 80, as will be understood.

Referring to FIGS. 2 and 3, the pivot arm 70 normally supports the sensor switch 29 in a vertical position as determined by the force of gravity on the switch components. The socket 62 has a perfectly spherical upper or exterior surface 82, having a center of curvature at the center of the ball tip 68 of the pivot arm 70. Under the action of the leaf spring 72, the socket 62 can be securely clamped so as to be motionless, in the transmitter casing 16. The clamping force being exerted upwardly on the socket 62 causes the latter to frictionally engage the casing top wall 18.

At the time that the casing 16 is placed on a supporting surface, the resetting of the sensor switch 29 is effected so as to orient the same to any new position wherein it hangs perfectly vertical, below the pivot ball 68. This is done by a reset mechanism carried by the top wall 18 by the casing 16, such reset mechanism comprising a reset lever 84 secured to a leaf spring 86 and fastened by screws 88 to the underside of the casing top wall 18. The reset level 84 extends over and is normally spaced from the pivot arm 70, being substantially at right angles thereto; it carries an apertured plate 90 having an opening 92 through which the reset plunger 28 extends. Above the plate 90, the plunger 28 carries an annular shoulder or washer member 94 which is fixed thereto and which acts against the member 90 when the reset plunger 28 is depressed. Such action causes the reset lever 84 to first electrically and mechanically contact the reset arm 70, from which it has been normally separated. Continued downward movement of the reset plunger 28 will effect downward movement of the pivot arm 70, releasing the socket 62 whereupon gravity can act on the switch 29 to effect a perfectly vertical alignment of the same, for which condition the mercury pool 32 is disengaged from the annular contact 50. Release of the reset mechanism 26 will cause the reset lever 84 to move upward and out of engagement with the pivot arm 70, the latter also moving upward under the biasing action of the leaf spring 72 and causing a clamping of the socket 62 against the friction plate 76 of the top wall 18. The sensing switch 29 can thus be reset to a perfectly vertical position, regardless of the slope (within limits) of the supporting surface on which the transmitter casing 16 has been placed. Preferably a layer of silicone oil 95 or its equivalent is placed on the mercury pool 32 to reduce or eliminate oxidation or contamination of the surface thereof.

The button 30 on the reset device 26 is arranged to engage the casing top wall 18 so as to limit downward movement of the pivot arm whereby the socket 62 is held captive at all times on the ball 68.

It will now be understood that with the above arrangement, after the transmitter unit 14 has been put in position on the equipment or property which is to be protected, and after the reset mechanism 26 has been actuated to free and again clamp the sensitive switch 29, any slightest movement of the transmitter housing 16 will cause closing of the switch 29 since the mercury pool 32 will be disturbed and effect an electrical connection between the annular contact members 36 and 50. It will be seen in FIG. 5 that the mercury pool has a reverse or convex meniscus, presenting a rounded surface at the sharp depending edge 96 of the annular contact 50. We have found that with the organization described above, an extremely delicate and accurate setting and orientation of the switch 29 can be effected due to the novel pivot and socket organization provided, whereby the switch assumes essentially a perfect vertical position after being reset, and also whereby the slightest change such as movement, tilting, etc. which the transmitter casing 16 experiences, will cause a disturbance of the mercury and at least a momentary closing of the switch 29 of which the mercury is a part. Such sensitivity in the reset device, and in the functioning of the switch 29 completely prevents an intruder or unauthorized person from tampering with the transmitter unit or equipment on which it is placed, without causing a signal to be given to the receiver unit 10. The sensitivity of response of the switch 29 is also a function of the setting of the adjusting screw 46.

In accordance with the present invention, a unique monitor or safety switching arrangement is provided in conjunction with the sensing switch 29, whereby at least a momentary signal will be transmitted from the transmitter upon each occasion of the reset mechanism being operated and prior to release of the socket 82 and switch 29 for re-orienting the latter, as well as upon the occasion of the on-off switch in the transmitter switching circuitry being opened for the purpose of intentionally rendering the transmitter inoperative or preventing its energization. Thus, even though a person were to shut off the energy source to the transmitter, or actuate the reset mechanism in the hope of preventing a signal being given, this would not go undetected.

Referring to FIG. 2, the radio transmitter per se is known diagrammatically in the form of a rectangular box 100, which is understood to contain the usual necessary components, including transistors, an oscillator, tuner, antenna and the like as required to make up a complete miniature radio transmitter. The box 100 is indicated as having a tie terminal 102 for connection with the plus lead 104 from a battery 106, which latter may be of the 9 volt variety. The battery 106 has a negative lead 108 connected with a ground terminal 110 on the box 100. Adjacent the ground terminal 110 there is a power input terminal 112 which is connected with the transmitting switching circuitry in such a manner that a plus voltage applied to the terminal 112 (as for example from the tie terminal 102) will fire or excite the transmitter.

The top wall 18 of the casing 16 carries the on-off slide switch 20 at its underside, such switch having the manually operable switch member 22 extending through the wall for access at the exterior thereof. The on-off switch 20 is connected with switching circuitry designated generally by the numeral 114, of the transmitter unit 14. Such switching circuitry can comprise the wires 116, 118, 120, 122, 124, 126 and 128. The wire 122 connects from the slide switch 20 to the lead 38 of the sensor switch 29, and the wire 124 connects the lug 80 of the sensor switch to the power input terminal 112 which also connects with the wires 126, 120. The wires 116, 118 are joined to each other and connected with the on-off switch 20 to provide a plus voltage on the same. From the on-off switch 20 the wire 128 connects with the leaf spring 86 of the reset lever 84, and from the leaf spring 72 of the pivot arm 70 the lead wire 126 goes to the transmitter power input terminal 112.

As provided by the invention, a sentinel or monitoring switch 132 is provided, arranged to be actuated and momentarily closed whenever the on-off switch is close-circuited during the shifting of the manually operable member 22 of the on-off switch, either from the "on" to the "off" position or vice versa. The monitor switch 132 can be a microswitch having a lever 134 which is engaged by a cam 136 provided on the on-off switch 20 and movable with the actuator 22 thereof. The wire 120 of the transmitter switching circuitry connects with the monitoring switch 132, and by such arrangement it will now be seen that movement of the operator 22 of the on-off switch between either of its extreme positions will cause a momentary excitation of the transmitter 100 whereby the latter sends out a signal to the receiver 10. The monitoring switch 132 thus constitutes an effective tamper-proof means, since any person operating the on-off switch will cause the transmitter to function, even though the casing 16 is not moved at all.

The invention further provides a second sentinel, or back-up switch responsive to the operation of the reset mechanism 26, in the form of the reset lever 84 and pivot arm 70 which are caused to engage each other whenever the reset mechanism is actuated, this occurring prior to the actual release of the socket from its restraint by the friction plate 76. By virtue of the wires 122, 128 on the one hand and the wires 124, 126 of the other hand, the sensor switch 29 is bridged or shunted by the back-up switch comprising the lever 84 and arm 70. Here, again, any effort on the part of an unauthorized person to defeat the operation of the transmitter unit 14 by operating the reset mechanism 26 will only result in the transmitter being energized and sending out a signal, even before the re-orientation of the switch 29.

Figure 5:
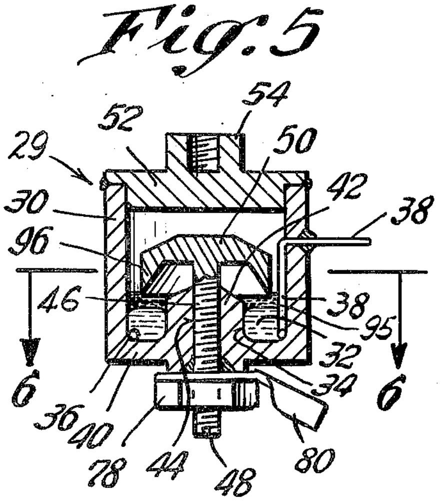
FIG. 5 is a fragmentary vertical sectional view of the ultrasensitive electrical switch or sensor device of the transmitter unit.
Figure 6:
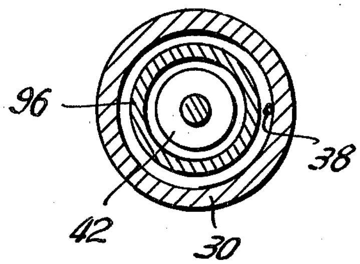
FIG. 6 is a horizontal section taken on the line 6—6 of FIG. 3.
Figure 7:
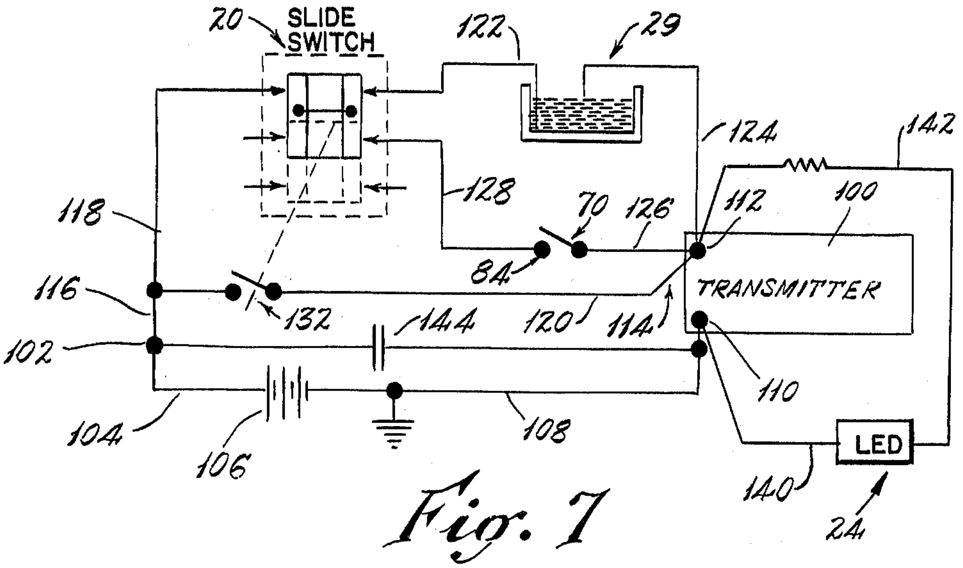
FIG. 7 is a schematic circuit diagram of the alarm system of the invention.

As seen in FIG. 5, the housing 30 of the sensor switch 29 is hermetically sealed, thereby to positively prevent loss of mercury from the same.

The invention further advantageously provides a useful, visual indicator in the form of the light emitting diode or LED 24 which is connected across the ground 110 and the power input terminal 112 by means of wires 140, 142. Thus, whenever the transmitter is energized, the LED 24 will light up, providing a visual indication of this fact. Also, at the time that the transmitter unit 14 is being initially set in place and prior to resetting of the mercury switch 29, the LED will be illuminated, indicating that the mercury switch is effecting an energization of the transmitter. Upon the reset mechanism being actuated after placement of the transmitter unit, the LED will again be useful to show the proper vertical orientation of the mercury switch 29, as it becomes extinguished.

In accordance with the present invention, a capacitor 144 is provided across the terminals of the battery 106 so as to be continuously charged thereby. Such capacitor will not adversely affect the shelf life of the battery, but will provide a strong surge to excite the transmitter at the instant that any of the above described switches becomes operative, thereby to sound an alarm at the receiver unit 10. There is thus avoided any build-up time which could otherwise occur when the transmitter is connected for energization, and this is important if the transmitter unit should be subjected to a sharp blow, since instant full capacitor-discharge energy will be impressed on the transmitter 100.

It will now be seen from the foregoing that I have provided a novel, especially convenient and easy-to-install and use, extremely-sensitive security alarm system which is completely and 100 percent tamper-proof inasmuch as it is impossible for an intruder or other person to vandalize or disturb the equipment being protected, or render inoperative the alarm system by any possible means even though such person understands fully the operation of the system. Nothing could possibly be done to the transmitter unit to defeat its operation once it is properly set in place, or to defeat the giving of a signal at the receiver unit. After the reset has been effected, a final additional actuation of the button 30 will momentarily illuminate the LED, indicating that all systems are working, including the monitor and back-up switches, switching circuitry, battery, capacitor 144, etc.

The equipment is relatively simple and straightforward in construction, and especially reliable in operation.

Variations and modifications are possible without departing from the spirit of the invention.

We claim:

1. A device of the kind described, comprising in combination:

(a) a casing, (b) an electrical, gravity-responsive switch construction disposed wholly in the casing, said switch construction being open-circuited when motionless and in a given predetermined position, and being closed-circuited when it experiences either acceleration or arcuate movement, or both, (c) suspension means for suspending the switch construction from a pivotal point above the same for free swinging movement, said suspension means enabling the switch construction, under the force exerted thereon by gravity, to occupy an infinitely large number of different arcuate positions within and with respect to the casing, (d) manually releasable clamping means acting on said suspension means, for normally maintaining the switch construction in any given one of said infinitely large number of arcuate positions with respect to the casing, thereby to normally maintain said switch construction open-circuited except when experiencing said acceleration or arcuate movement or both, (e) a second electrical switch construction connected in parallel with the first-mentioned switch construction, (f) means responsive to operation of said manually releasable means, for closing the circuit of said second electrical switch construction, (g) an electro-responsive device, and (h) circuit means connected with both said switch constructions, for controlling said electro-responsive device.

2. The invention as defined in claim 1, and further including:

(a) a self-contained radio transmitter in said casing, having switching circuitry connected with said electrical switch construction whereby the transmitter is operated when the switch construction and said casing experience acceleration or arcuate movement.

3. The invention as defined in claim 2, and further including:

(a) a radio receiver located at a place remote from said casing, said receiver being tuned to the frequency of said transmitter.

4. The invention as defined in claim 1, and further including:

(a) a self-contained radio transmitter in said casing, having switching circuitry connected with said first mentioned electrical switch construction whereby the transmitter is operated when the switch construction and said casing experience acceleration or arcuate movement.

5. The invention as defined in claim 1, wherein:

(a) the means for suspending the said switch construction comprises a hollow portion of a sphere which is carried by said construction, and a pivot ball carried by said casing and engaged with the inside of the sphere, (b) the center of curvature of the sphere exterior being at the center of said ball.

6. The invention as defined in claim 1, wherein:

(a) the manually releasable means is operative to lower the switch construction in releasing the same against restraint, (b) said second electrical switch construction being closed prior to the manually releasable means becoming operative to release the first-mentioned switch construction.

7. The invention as defined in claim 1, and further including:

(a) a self-contained electro-responsive device in said casing, having switching circuitry connected with said first mentioned electrical switch construction whereby the electro-responsive device is energized when the first-mentioned switch construction and said casing experience acceleration or arcuate movement, (b) a visual electrical indicator, and (c) means for energizing said indicator simultaneously with energization of the electro-responsive device whereby the operativeness of the electro-responsive device can be checked, (d) said electrical indicator enabling the position of the gravity responsive switch construction to be checked as well as the operativeness of the second electrical switch construction.

8. A device of the kind described, comprising in combination:

(a) a casing, (b) an electrical, gravity-responsive switch construction disposed wholly in the casing, said switch construction being open-circuited when motionless and in a given predetermined position, and being closed-circuited when it experiences either acceleration or arcuate movement, or both, (c) suspension means for suspending the switch construction from a pivotal point above the same for free swinging movement, said suspension means enabling the switch construction, under the force exerted thereon by gravity, to occupy an infinitely large number of different arcuate positions within and with respect to the casing, (d) manually releasable clamping means acting on said suspension means, for normally maintaining the switch construction in any given one of said infinitely large number of arcuate positions with respect to the casing, thereby to normally maintain said switch construction open-circuited except when experiencing said acceleration or arcuate movement or both, (e) an electro-responsive device disposed in said casing, having switching circuitry connected with said electrical switch construction, whereby the electro-responsive device is operated when the casing and switch construction experience acclera-tion or arcuate movement, (f) an on-off electrical switch connected in said switching circuitry, said on-off switch including a manually operable switch member having a circuit-closing movement and a circuit-opening movement, (g) a monitoring electrical switch connected with said switching circuitry to switch on the electro-responsive device, and (h) means responsive to circuit-opening movement of said manually operable switch member, for momentarily closing the said monitoring switch to activate the electro-responsive device prior to opening of the circuit by said on-off switch.

9. The invention as defined in claim 8, and further including:

(a) a visual electrical indicator, and (b) means for energizing said indicator simultaneously with energization of the electro-responsive device whereby the operativeness of said device can be checked, (c) said electrical indicator enabling the position of the gravity-responsive switch construction to be checked as well as the operativeness of the said monitoring electrical switch.

10. The invention as defined in claim 8, wherein:

(a) said monitoring switch comprises a micro-switch having an operating plunger, (b) said means for momentarily closing the monitoring switch comprising a projection on the manually-operable switch member.

11. The invention as defined in claim 8, wherein:

(a) the electro-responsive device comprises a radio transmitter.

12. A device of the kind described, comprising in combination:

(a) a casing, (b) an electrical, gravity-responsive switch construction disposed wholly in the casing, said switch construction being open-circuited when motionless and in a given predetermined position, and being closed-circuited when it experiences either acceleration or arcuate movement, or both, (c) suspension means for suspending the switch construction from a pivotal point above the same for free swinging movement, said suspension means enabling the switch construction, under the force exerted thereon by gravity, to occupy an infinitely large number of different arcuate positions within and with respect to the casing, and (d) manually releasable clamping means acting on said suspension means, for normally maintaining the switch construction in any given one of said infinitely large number of arcuate positions with respect to the casing, thereby to normally maintain said switch construction open-circuited except when experiencing said acceleration or arcuate movement or both, (e) said means for suspending the switch construction comprising an upstanding, upwardly-facing pivot member carried by the casing, and a downwardly-facing socket member carried by the switch construction and disposed over the pivot member, (f) said socket member being adapted to hang the switch construction pendant under the pivot member.

13. The invention as defined in claim 12, wherein:

(a) the casing has a laterally extending arm on one end of which the pivot member is mounted, and (b) means mounting the other end of said arm in the casing for pivotal movement therein.

14. The invention as defined in claim 12, wherein:

(a) the casing has friction means engageable with the socket member to minimize slippage therebetween.

15. The invention as defined in claim 13, and further including:

(a) a second electrical switch construction connected in parallel with the first-mentioned switch construction, and (b) means responsive to the operation of said manually releaseable means, for closing said second switch construction, (c) said manually-releasable means comprising an actuator member movably mounted in the casing and adapted for engagement with said pivot member, (d) said actuator and pivot members constituting said second switch construction.

16. The invention as defined in claim 15, wherein:

(a) the pivot member includes a leaf spring constituting a base by which the member is mounted and which biases the member upward, (b) said actuator member extending over said pivot member and having a leaf spring base by which it is mounted.

17. The invention as defined in claim 15, and further comprising:

(a) means for lowering the pivot member comprising a plunger movably carried by the casing, and (b) cooperable means on said plunger and casing, limiting movement of the plunger in the direction which lowers the pivot member whereby said socket member is prevented from becoming dislodged from the pivot member while remaining separated from the said bearing member.

* * * * *